United States Patent [19]

Davis

[11] Patent Number: 5,504,410
[45] Date of Patent: Apr. 2, 1996

[54] SWITCHING CIRCUIT

[75] Inventor: Rex M. Davis, Leicestershire, England

[73] Assignee: Switched Reluctance Drives Limited, Leeds, England

[21] Appl. No.: 180,957

[22] Filed: Jan. 13, 1994

[30]     Foreign Application Priority Data

Jan. 14, 1993 [GB] United Kingdom ............ 9300734

[51] Int. Cl.$^6$ .................................................... H02P 1/46
[52] U.S. Cl. ......................... 318/701; 318/254; 318/439; 318/138
[58] Field of Search ............................. 318/701, 254, 318/139, 439

[56]              References Cited

U.S. PATENT DOCUMENTS

| | | | |
|---|---|---|---|
| 5,289,107 | 2/1994 | Radun et al. | 318/701 |
| 5,291,115 | 3/1994 | Ehsani | 318/701 |
| 5,327,069 | 7/1994 | Radun et al. | 318/701 |
| 5,350,990 | 9/1994 | Austermann et al. | 318/701 |

FOREIGN PATENT DOCUMENTS 2092946  3/1993  Canada.

OTHER PUBLICATIONS

A. Nabae, et al., IEEE Transactions on Industry Applications, vol. I A–17, Sep./Oct. 1981, pp. 518–523.

*Primary Examiner*—William M. Shoop, Jr.
*Assistant Examiner*—Karen Masih
*Attorney, Agent, or Firm*—Patterson & Keough

[57]                ABSTRACT

A switching circuit for a switched reluctance motor or generator comprises positive and negative power lines, a string of smoothing capacitors serially connected between them and two pairs of gate turn-off thyristors connected to either end of a phase winding of the motor or generator. Circulating diodes are connected between the ends of the winding and the opposite power line and further circulating diodes are connected between each pair of thyristors. A mid-point between the capacitors is connected between the further diodes. At switch-off one of the outer GTO's is first opened so that one of the diodes conducts and current in the winding is routed via the mid-point. Then the other outer GTO is opened so that current now circulates through both of the diodes and substantially no voltage is dropped across the winding. The first inner GTO is then opened causing one of the diodes to conduct. Thereafter the second inner GTO can be opened. Turn-on requires a progressive reversal of the turn-off sequence if winding current continues to flow. Otherwise, all but one outer GTO are turned on together followed by the omitted GTO after a delay. The GTO to be omitted initially at turn-on is chosen to provide the desired correction to the voltage at the midpoint.

12 Claims, 3 Drawing Sheets

| COMPONENT | | | | | | | | | |
|---|---|---|---|---|---|---|---|---|---|
| 24 | 36 | 22 | 26 | 32 | 38 | 30 | 34 | 16 | 20 |
| 1 | 0 | 1 | 0 | 1 | 0 | 1 | 0 | ϕ | $V_L$ |
| 0 | 1 | 1 | 0 | 1 | 0 | 1 | 0 | − | $V_L/2$ |
| 0 | 1 | 1 | 0 | 0 | 1 | 1 | 0 | ϕ | 0 |
| 0 | 0 | 0 | 1 | 0 | 1 | 1 | 0 | + | $-V_L/2$ |
| 0 | 0 | 0 | 1 | 0 | 0 | 0 | 1 | ϕ | $-V_L$ |

STATE

Fig 4

| COMPONENT | | | | | | | | | |
|---|---|---|---|---|---|---|---|---|---|
| 24 | 36 | 22 | 26 | 32 | 38 | 30 | 34 | 16 | 20 |
| 1 | 0 | 1 | 0 | 1 | 0 | 1 | 0 | ϕ | $V_L$ |
| 0 | 1 | 1 | 0 | 1 | 0 | 1 | 0 | − | $V_L/2$ |
| 0 | 0 | 0 | 1 | 1 | 0 | 1 | 0 | ϕ | 0 |
| 0 | 0 | 0 | 1 | 0 | 1 | 1 | 0 | + | $-V_L/2$ |
| 0 | 0 | 0 | 1 | 0 | 0 | 0 | 1 | ϕ | $-V_L$ |

STATE

Fig 5

SWITCHING CIRCUIT

BACKGROUND OF THE INVENTION

1. Field of the Invention

This invention relates to switching circuits.

The invention is particularly, though not exclusively, applicable to switching circuits for electric motors and generators.

2. Description of Related Art

Electric motors and generators commonly rely on switching circuits for their control. In the case of switched reluctance motors a power converter typically provides pulses of unidirectional current in sequence to each of the phase windings. Similar sequential switching regimes are used to draw power from a switched reluctance generator.

The source of the power for the converter is typically a capacitively smoothed direct voltage source— often referred to as a 'dc link'—which can be derived from a dc power supply or battery, or derived from a rectifier circuit which draws power from an ac source. The dc link is periodically switched to the windings of the switched reluctance motor/generator using semiconductor power switching devices.

Where the voltage of the dc link is relatively low, the semiconductor power switching devices through which the windings are energized have adequate voltage ratings to allow a single semiconductor device to be used in association with each phase as shown in FIG. 1. Typical power converter circuits will be known to the skilled person and a variety of power switching devices is available, including bipolar transistors and field-effect transistors, insulated gate bipolar transistors, gate turn-off thyristors, MOS-controlled thyristors, static induction thyristors and other devices having the ability to switch between a high impedance OFF state and a lower impedance ON state and vice versa.

There also exist power modules incorporating more than one semiconductor power switching device. These are also applicable to switched reluctance power converters.

In circumstances in which the dc link voltage is too large for the voltage rating of an appropriate semiconductor power switching device, a common solution is to connect two switching devices in series. This series connection of two power switching devices ideally allows each device to be exposed, both transiently and in the OFF state, to approximately half the voltage across the two devices together. However, as a practical matter series connected semiconductor switching devices are unlikely to turn on or off at precisely the same instant. Any delay in switching times of one device with respect to the other will give rise to an excessive voltage appearing across the slower or later device at switch on and across the faster or earlier device at switch off.

For example, FIG. 1 illustrates a power converter system for one phase winding 1 of a switched reluctance motor. When the unexcited winding 1 is suddenly connected to the dc link by the two power switching devices 3 and 4 which receive actuating signals at their respective control electrodes 5 and 6, the voltage across the winding changes suddenly from zero to $V_L$, where $V_L$ is the link voltage.

If, while current is still flowing in the winding 1, one of the two power switching devices 3 and 4 is switched off (say 3) by applying or removing the appropriate control signal to its control electrode, the winding current is compelled to flow through one of a pair of diodes 7 and 8 (say 8), respectively connected between each end of the winding and the opposite voltage dc link terminal, and the other power switching device 4 which remains actuated.

The winding voltage changes suddenly from $V_L$ to approximately zero and the current in the winding varies at a rate depending primarily on the current in the winding inductance, the value of the winding inductance itself, the rate of change of the winding inductance and on the resistance of the winding.

Alternatively if, while the winding current is still flowing, both power switching devices are switched off simultaneously the winding current is compelled to flow through both diodes which are so connected to the dc link that the winding voltage changes suddenly from $V_L$ to $-V_L$.

SUMMARY OF THE INVENTION

It is an object of the present invention to ensure that each of a group of series connected power switching devices is only exposed to a fraction of the dc link voltage when in its off state, the said fraction being approximately 1/nth where there are n series connected power switching devices in a group.

It is also an object of the present invention to reduce the severity of sudden voltage changes across a winding of, for example, an electric motor or other inductive load, where control switching is effected by two or more power switching devices connected in series.

According to the present invention there is provided a switching circuit for an inductive element, the switching circuit comprising first and second terminals, capacitors serially connected between the first and second terminals and defining an electrical intermediate point between them, a pair of element connections, first power switch means comprising at least two power switches serially connected to conduct from the first terminal to one of the element connections, second power switch means, comprising at least two power switches serially connected to conduct from the other of the element connections to the second terminal, first diode means connected for conduction from the second terminal to the said one element connection, second diode means connected for conduction from the said other element connection to the first terminal, third and fourth diode means serially connected to conduct from between the power switching devices of the second power switch means to between the power switching devices of the first power switch means, the serial connection between the third and fourth diode means being connected with the intermediate point between the capacitors.

Thus, one end of each winding of, for example, a switched reluctance motor can be connected to the positive terminal of a capacitively smoothed direct voltage source via two power transistors or other semiconductor switches connected in series and the other end of each winding can be connected with the negative terminal of the direct voltage source via two further power transistors or other semiconductor switches connected in series. In addition each winding end can be connected with the opposite polarity input terminal via the first and second circulating diodes (or two or more diodes in series in each case) with their conducting directions arranged so that they only return energy to the dc link.

The smoothing capacitors are preferably arranged in one or more parallel connected series strings, each string preferably comprising an even number of capacitors of substantially equal value connected in series and having an electrical connection at the mid-point of the or each series string.

The third diode means are connected to conduct from the or each mid-point to the common connection between the first pair of power transistors of the switching means. The fourth diode means are connected to conduct from the common connection between the second pair of power transistors or other switching means to the or each mid-point.

The intermediate point is the position along the string of smoothing capacitors at which substantially equal voltages will be dropped across the capacitors connected between the intermediate point and each of the two terminals of the direct voltage source. Thus, while an even number of capacitors of substantially equal capacitance and individual voltage rating may conveniently define a mid-point in the middle of a string, an odd number of capacitors having differing voltage ratings may equally well define such a mid-point depending on the value of the capacitors used. Equally, an intermediate point other than the mid-point may also be defined such that the power switching means are not exposed to damaging voltage magnitudes transiently or in their OFF states.

BRIEF DESCRIPTION OF THE DRAWINGS

The present invention can be put into practice in various ways one of which will now be described by way of example with reference to the accompanying drawings in which:

FIG. 4 is a sequence table for actuating the power convertor of FIG. 2; and

FIG. 5 is an alternative sequence table for actuating the power convertor of FIG. 2.

DETAILED DESCRIPTION OF PREFERRED EMBODIMENTS

Figure 1:
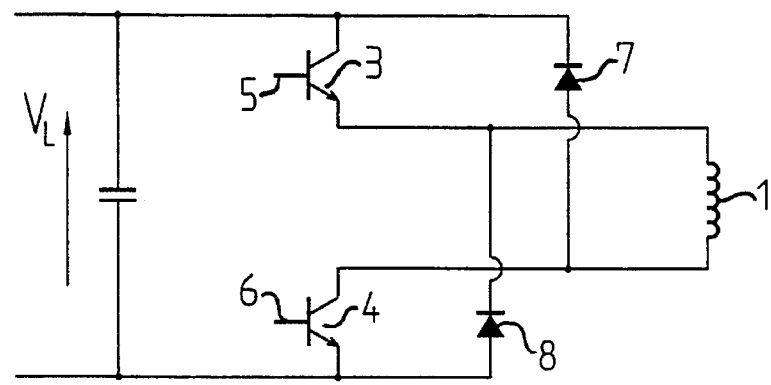
FIG. 1 illustrates a power converter system for one phase winding of a switched reluctance motor.
Figure 2:
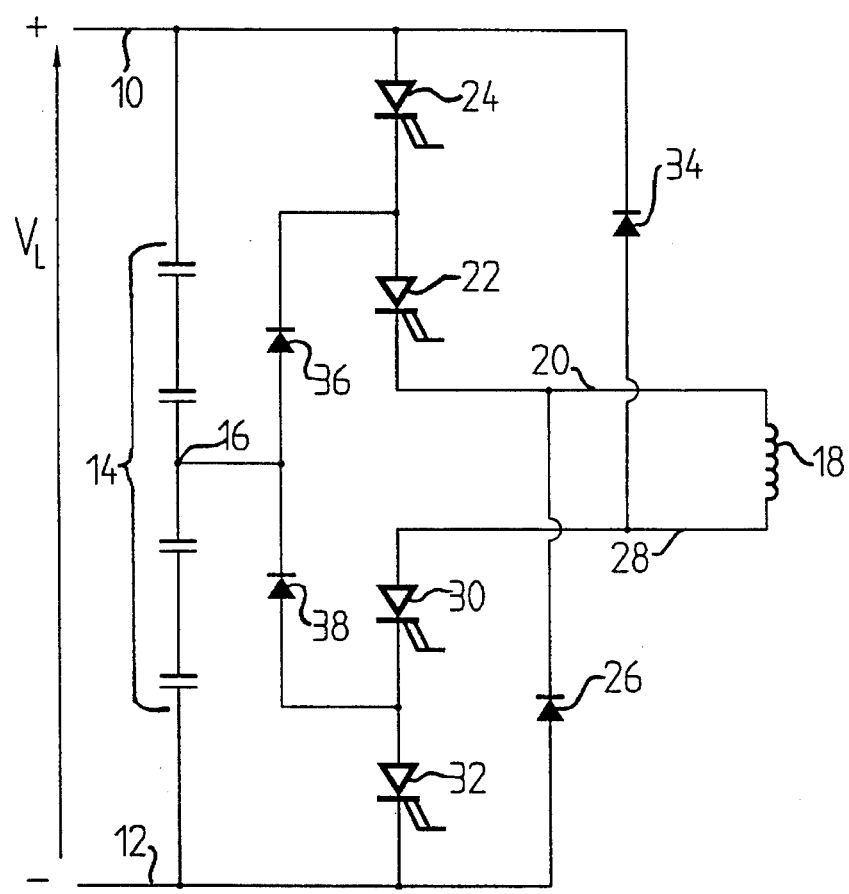
FIG. 2 is a circuit diagram of a power converter according to the invention for one phase of a switched reluctance motor or generator.

FIG. 2 shows an example of a power converter for one phase of a switched reluctance (SR) motor or generator according to the invention. When the converter is used in conjunction with a polyphase motor, an electrical power supply $V_L$ is sequentially switched across each phase of the motor to induce movement. In the case of a generator, the driven rotor or other secondary element is mechanically driven to enhance the current in the windings which are sequentially switched to feed the generated power to a storage device or to drive electrical equipment.

The positive and negative terminals 10 and 12 of a dc link have a string of four series connected capacitors 14 (of similar capacitance and voltage rating) connected between them. The connection between the middle two capacitors defines an electrical mid-point connection 16. A winding 18 of the SR motor has one end 20 connected, via two series connected gate turn-off (GTO) thyristors 22 and 24, to the positive terminal 10 and, via a diode 26 to the negative terminal 12. The GTO thyristors 22 and 24 are connected to conduct from the positive terminal 10 to the end 20 of the winding 18 and the diode 26 is connected to conduct from the negative terminal 12 to the end 20. The other end 28 of the winding 18 is connected, via two series GTO thyristors 30 and 32 to the negative terminal and, via a diode 34 to the positive terminal 10. The GTO thyristors 30 and 32 are connected to conduct from the end 28 of the winding 18 to the negative terminal 12 and the diode 34 is connected to conduct from the end 28 to the positive terminal 10. The mid-point connection 16 is connected via a diode 36 to the common connection between the GTO's 22 and 24 and via a diode 38 to the common connection between the GTO's 30 and 32. It will be understood by those skilled in the art that other controllable switches can be substituted for the GTO thyristors without departing from the scope of the invention. Examples of alternative semiconductor switches are mentioned in the introduction.

The benefits provided by the invention are realized not by turning off the GTO thyristors 22 and 24 or 30 and 32 simultaneously, but in sequence. When turning off, the GTO thyristor connected to a particular end of the winding is turned off after its associated GTO thyristor connected with the dc link. When turning on, the GTO thyristor connected to a particular end of the winding is turned on before its associated GTO thyristor connected with the dc link. When thus operated the circuit of FIG. 2 ensures that each GTO thyristor will only be exposed to an OFF state voltage which is approximately half of the dc link voltage appearing across the string of capacitors 14. In order to achieve the said benefits, the turn-off and turn-on sequences for the four GTO thyristors follow a prescribed pattern, examples of which are described below.

Consider firstly the turn-off sequence, beginning with all four GTO thyristors 22, 24, 30 and 32 conducting. The first turn-off signal must be applied to one of the outer GTO thyristors 24 or 32. Taking the GTO 24: as soon as it turns off, the diode 36 conducts and the OFF state voltage across the GTO 24 is limited to approximately half the voltage across the string of capacitors 14. The current in the motor winding 18 is drawn via the GTO 22 and the diode 36 from the mid-point 16 of the capacitor string causing the voltage at the mid-point 16 to change slightly negatively. The next GTO to be turned off is 32 which forces the diode 38 to conduct. The OFF state voltage across the GTO 32 is then limited to approximately half the voltage across the capacitor string 14. The voltage at the mid-point 16 then ceases changing negatively and the winding current circulates through the GTO 30, the diodes 38 and 36, and the GTO 22 with substantially zero voltage across the winding 18. The GTO 22 is then turned off, forcing the winding current to transfer to the diode 26. Winding current then flows via the GTO 30, and the diode 38 to the mid-point 16 causing the voltage of the mid-point 16 to change slightly positively. The GTO 30 is then turned off after a further delay during which the voltage at the mid-point 16 has returned to its desired value approximately midway between the potentials at the terminals 10 and 12.

The time delays between turning off (or on) GTO's 24 and 32 and GTO's 22 and 30 can be conveniently determined by the voltage excursions of the mid-point 16 or by other means or measurements whereby the voltage at the mid-point 16 is maintained at substantially half $V_L$ or at least within prescribed safe limits. The purpose of the invention is to avoid exposing the GTO's to a damagingly large voltage and the voltage of the mid-point need not necessarily be maintained at half of $V_L$ during switch-over to achieve this.

The conduction pattern of GTO thyristors and diodes during this example of the turn-off sequence is summarised in the table of FIG. 4 in which component numerals correspond to those used in FIG. 2 and:

1=device conduction

0=the device in the off state

+=a positive going change in the voltage at the midpoint 16

−=a negative going change in the voltage at the midpoint 16

∅=no change of voltage at midpoint 16

$V_L$=dc link voltage applied to the winding 18

$V_L/2$=half dc link voltage

An alternative turn-off sequence is summarized in the table of FIG. 5.

Provided winding current continues to flow, the progression downwards through either sequence table (reducing winding voltage) can be reversed (increasing winding voltage), finishing at any row within the Table which does not involve a changing voltage at the midpoint 16, i.e. ∅.

If, however, winding current has ceased to flow, the turn-on sequence involves turning on three of the four GTO's, omitting GTO 24 or 32 initially. This applies half of the dc link voltage $V_L$ to the motor winding, but causes the mid-point 16 to change its potential either negatively or positively, depending on which GTO is omitted. Assuming the GTO 24 was initially not turned on, to restore the mid-point potential, the omitted GTO 24 is turned on and the GTO 32 is turned off until the mid-point 16 potential has been restored to its desired value approximately midway between the potentials of the terminals 10 and 12 of the direct voltage source. Thereafter, the other (non-conducting) GTO 32 is reactuated so that winding current is drawn from the direct voltage source not from (or directed to) the mid-point 16. Alternatively, successive turn-on sequences can alternate between that in which GTO 24 is omitted initially and that in which GTO 32 is omitted initially. This would ensure that any change in voltage at the midpoint 16 caused by a particular turn-on sequence is removed by the next turn-on sequence, thus ensuring that there is no progressive change in potential at the midpoint 16.

Additional phase windings of an SR motor or generator with their own sets of power semiconductor devices can conveniently use the same string (or sets of strings in parallel) of capacitors or can be provided with their own independent strings of capacitors. Where the same strings of capacitors serve all phases of the SR motor or generator, the switching sequences of all phases can be coordinated to limit the voltage excursions of the mid-point 16, maintaining its potential between prescribed limits.

Figure 3:
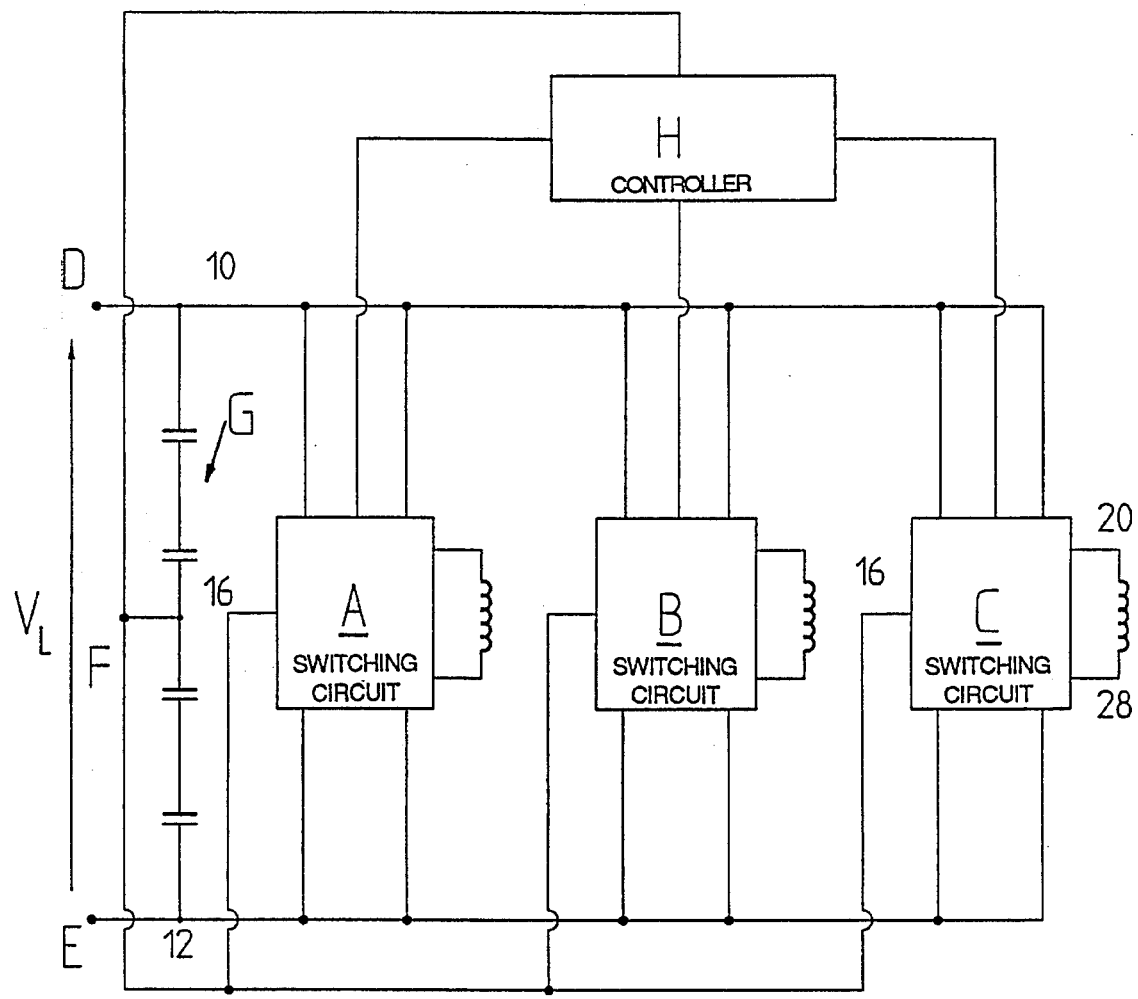
FIG. 3 is a circuit diagram of a power converter and controller according to the invention for a three phase switched reluctance motor.

FIG. 3 shows a switching circuit for a 3-phase switched reluctance motor or generator. The circuit comprises three switching circuits, A, B and C as shown in FIG. 2 all connected in parallel with the terminals D and E and to the midpoint F between series connected capacitors E. A controller H is arranged to actuate the sequential switching of the power switching devices in an appropriate sequence(s).

It will be understood by those skilled in the art that more than two power semiconductor switches can be arranged in series, in which case the capacitor strings must be subdivided into the same number of series sections, with two or more intermediate connections to diodes in a string (or diode strings) instead of a single midpoint. The sequential switching of the power semiconductor switches becomes more complex if the potentials of the said intermediate connections are to be maintained within prescribed limits.

It will also be understood by those skilled in the art that two or more separately powered sources of direct voltage, each capacitively smoothed, and in series with each other, may be used with their common connection(s) providing the mid-point or intermediate points to which diodes or diode strings are connected. The provision of separately powered sources of direct voltage removes the need to incorporate means for measuring and maintaining the voltage(s) at the said mid-point or intermediate points within prescribed limits.

Although some illustrative embodiments of the invention have been described in detail, there are many variations that come within the spirit and scope of the invention. Accordingly, the invention is to be limited only as particularly defined in the appended claims.

What is claimed is:

1. A switching circuit for an inductive element having two element connections, the switching circuit comprising positive and negative terminals, capacitors serially connected between the positive and negative terminals and defining an electrical intermediate point between them, a first power switch arrangement comprising two power switches serially connected to conduct from the positive terminal to one of the element connections, a second power switch arrangement comprising two power switches serially connected to conduct from the other of the element connections to the negative terminal, first diode means connected for conduction from the negative terminal to the one element connection, second diode means connected for conduction from the other element connection to the positive terminal, and third and fourth diode means serially connected to conduct from between the power switches of the second power switch arrangement to between the power switches of the first power switch arrangement, the serial connection between the third and fourth diode means being connected with the intermediate point between the capacitors.

2. A circuit as claimed in claim 1 in which and the intermediate point is a mid-point between an even number of the serially connected capacitors.

3. A circuit as claimed in claim 1 in which a plurality of strings of serially connected capacitors are connected between the positive and negative terminals.

4. A circuit as claimed in claim 1 in which one or more of the diode means comprise a plurality of serially connected diodes.

5. A circuit as claimed in claim 1 arranged for controlling the supply of power to an inductive load, wherein the positive and negative terminals are respectively positive and negative power input terminals and the element connections are output terminals for the inductive load.

6. A circuit as claimed in claim 1 in which the inductive element is a phase winding of an electric motor, the phase winding being connected across the element connections, and further comprising a controller that is operable selectively to actuate switching of the switching circuit to control the current to the winding.

7. A circuit as claimed in claim 1 in which the inductive element is a phase winding of an electric generator, the phase winding being connected across the element connections, and further comprising a controller that is operable selectively to actuate switching of the switching circuit to control the current from the winding.

8. A circuit as claimed in claim 1 in which each power switch is a gate turn-off thyristor.

9. A method of operating a switching circuit for an inductive element having two element connections, the switching circuit comprising positive and negative terminals, capacitors serially connected between the positive and negative terminals and defining an electrical intermediate point between them, a first power switch arrangement comprising two power switches serially connected to conduct from the positive terminal to one of the element connections, a second power switch arrangement comprising two power switches serially connected to conduct from the other of the element connections to the negative terminal, first diode means connected for conduction from the negative terminal to the one element connection, second diode means connected for conduction from the other element connection to the positive terminal, and third and fourth diode means serially connected to conduct from between the power switches of the second power switch arrangement to between the power switches of the first power switch arrangement, the serial connection between the third and fourth diode means being connected with the intermediate point between the capacitors, the method comprising operating the first and second power switch arrangements such that no more than three of the power switches are switched simultaneously.

10. A switching circuit for a phase winding of a switched reluctance machine, the switching circuit comprising positive and negative power input terminals, an even number of capacitors serially connected between the positive and negative power input terminals and defining an electrical midpoint between them, a first pair of power switches serially connected to conduct from the positive power input terminal to one end of the phase winding, a second pair of power switches serially connected to conduct from the other end of the phase winding to the negative power input terminal, a first diode connected for conduction from the negative power input terminal to the one end of the phase winding, a second diode connected for conduction from the other end of the phase winding to the positive power input terminal, and third and fourth diodes serially connected to conduct from between the second pair of power switches to between the first pair of power switches, the serial connection between the third and fourth diodes being connected with the midpoint between the capacitors.

11. The switching circuit of claim 10, wherein the first pair of power switches comprises a pair of gate turn-off (GTO) thyristors.

12. The switching circuit of claim 10, wherein the second pair of power switches comprises a pair of gate turn-off (GTO) thyristors.

* * * * *

UNITED STATES PATENT AND TRADEMARK OFFICE
CERTIFICATE OF CORRECTION

PATENT NO. : 5,504,410
DATED : April 2, 1996
INVENTOR(S) : Rex M. Davis

It is certified that error appears in the above-identified patent and that said Letters Patent is hereby corrected as shown below:

Title page of the patent the foreign application priority information should be as follows:

[30]    Foreign Application Priority Data
    Jan. 13, 1993 [GB]    United Kingdom ........... 9300734

Signed and Sealed this

Second Day of March, 1999

Attest:

Q. TODD DICKINSON

*Attesting Officer*    *Acting Commissioner of Patents and Trademarks*